US008219302B2

(12) United States Patent
Yamashita et al.

(10) Patent No.: US 8,219,302 B2

(45) Date of Patent: Jul. 10, 2012

(54) FUEL INJECTION CONTROLLER FOR INTERNAL COMBUSTION ENGINE

(75) Inventors: Hiroshi Yamashita, Anjo (JP); Akinori Kouda, Kariya (JP)

(73) Assignee: Denso Corporation, Kariya (JP)

(*) Notice: Subject to any disclaimer, the term of this patent is extended or adjusted under 35 U.S.C. 154(b) by 696 days.

(21) Appl. No.: 12/469,860

(22) Filed: May 21, 2009

(65) Prior Publication Data

US 2009/0299611 A1 Dec. 3, 2009

(30) Foreign Application Priority Data

May 30, 2008 (JP) ................................ 2008-143724

(51) Int. Cl.
*F02D 41/30* (2006.01)
*G06F 19/00* (2011.01)
*F02M 15/00* (2006.01)

(52) U.S. Cl. ...................................................... 701/106

(58) Field of Classification Search .................. 701/106, 701/103–105, 114, 115; 123/690, 478, 480, 123/672
See application file for complete search history.

(56) References Cited

U.S. PATENT DOCUMENTS 5,730,111 A 3/1998 Kaji et al.
7,195,008 B2 3/2007 Annoura et al.
7,356,985 B2 4/2008 Hirata et al.
7,650,226 B2 * 1/2010 Ishizuka et al. ............... 701/114
2009/0241905 A1 10/2009 Tomiita et al.

FOREIGN PATENT DOCUMENTS

JP 06-003304 1/1994
JP 2003-129887 5/2003
JP 2006-002595 1/2006
JP 2006-299945 11/2006

OTHER PUBLICATIONS

Japanese Office Action dated Oct. 25, 2010 issued in corresponding Japanese Application No. 2008-143724, with English Translation.
Japanese Office Action dated Aug. 18, 2010 for corresponding Japanese Application No. 2008-143724, with English Translation.

* cited by examiner

*Primary Examiner* — Hieu T Vo
(74) *Attorney, Agent, or Firm* — Nixon & Vanderhye PC

(57) ABSTRACT

When a specified learning executing condition is established, a command furl injection quantity ratio (CFIQ-ratio) between two fuel injectors is compulsorily changed and a fuel injection quantity error of each fuel injector is learned respectively based on the CFIQ-ratio and an air-fuel-ratio feedback correction value. Based on the learning value of fuel injection quantity error, a fuel injection period of each fuel injector is respectively corrected, whereby each fuel injection quantity error of two fuel injectors is respectively corrected with respect to each cylinder. Thereby, a ratio of fuel injection quantity between two fuel injectors is accurately controlled.

3 Claims, 5 Drawing Sheets

FIG. 3

FUEL INJECTION QUANTITY ERROR
INJECTOR "A": +5%
INJECTOR "B": -10%

| | ACTUAL FUEL INJECTION QUANTITY OF INJECTOR "A" | ACTUAL FUEL INJECTION QUANTITY OF INJECTOR "B" | ACTUAL TOTAL FUEL INJECTION QUANTITY | AIR-FUEL-RATIO FEEDBACK CORRECTION VALUE |
|---|---|---|---|---|
| CFIQ-RATIO 40 : 60 | 42 | 54 | 96 | −4 |
| CFIQ-RATIO 50 : 50 | 52.5 | 45 | 97.5 | −2.5 |
| CFIQ-RATIO 60 : 40 | 63 | 36 | 99 | −1 |

FUEL INJECTION CONTROLLER FOR INTERNAL COMBUSTION ENGINE

CROSS-REFERENCE TO RELATED APPLICATION

This application is based on Japanese Patent Application No. 2008-143724 filed on May 30, 2008, the disclosure of which is incorporated herein by reference.

FIELD OF THE INVENTION

The present invention relates to a fuel injection controller for an internal combustion engine provided with a plurality of fuel injectors for an intake side of each of respective cylinders of the internal combustion engine.

BACKGROUND OF THE INVENTION

JP-2006-299945A shows an internal combustion engine where each cylinder is provided with two fuel injectors for two respective intake ports, so that fuel spray is atomized and a quantity of fuel adhering on an inner wall surface of an intake port is reduced.

JP-8-338285A (U.S. Pat. No. 5,730,111) shows an air-fuel ratio control system where an air-fuel ratio (fuel injection quantity) is controlled with respect to each cylinder based on outputs of an air-fuel ratio sensor disposed at a confluent portion of exhaust gas discharged from each cylinder.

A fuel injection quantity may have an error (a deviation in an actual fuel injection quantity from a command fuel injection quantity) due to an individual manufacturing tolerance or aging of a fuel injector. If the air-fuel ratio control shown in JP-8-338285A is applied to an internal combustion engine shown in JP-2006-299945A, an error of total fuel injection quantity can be corrected. However, an individual error of each fuel injector can not be corrected. Thus, in a case that a fuel injection ratio between two fuel injectors is changed in order to reduce emission and improve fuel economy, the fuel injection ratio between two fuel injectors can not be correctly controlled.

SUMMARY OF THE INVENTION

The present invention is made in view of the above matters, and it is an object of the present invention to provide a fuel injection controller for an internal combustion engine provided with a plurality of fuel injectors for an intake side of each of respective cylinders, which is able to correct an error of fuel injection quantity of each fuel injector and to correctly control a fuel injection ratio between the fuel injectors of each cylinder.

According to the present invention, a fuel injection controller changes a ratio of command fuel injection quantity between the fuel injectors according to a running condition of the internal combustion engine. Further, the fuel injection controller includes an error learning means for learning a fuel injection quantity error information representing an error of fuel injection quantity of the respective fuel injectors or a correction value for correcting the error of the fuel injection quantity of the respective fuel injectors based on the ratio of command fuel injection quantity between the fuel injectors and an output of the exhaust gas sensor.

In a case that there is a fuel injection quantity error between a plurality of fuel injectors, an actual total fuel injection quantity of the fuel injectors for a single cylinder varies according to a command fuel injection quantity ratio. The air-fuel ratio varies and the output of the exhaust gas sensor 24 varies. Therefore, there is a correlation between the fuel injection quantity error, the command fuel injection quantity ratio, and the output of the exhaust gas sensor. Based on the command fuel injection quantity ratio and an output of the exhaust gas sensor, the fuel injection quantity error information can be respectively learned with respect to each of the respective fuel injectors. Thereby, each fuel injection quantity error of a plurality of fuel injectors can be respectively corrected, and a ratio of fuel injection quantity between fuel injectors can be correctly controlled.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 3 is a table for explaining a relationship between a command fuel injection quantity ratio (CFIQ-ratio) and an air-fuel-ratio feedback correction value;

DETAILED DESCRIPTION OF EMBODIMENTS

An embodiment of the present invention will be described hereinafter.

Figure 1:
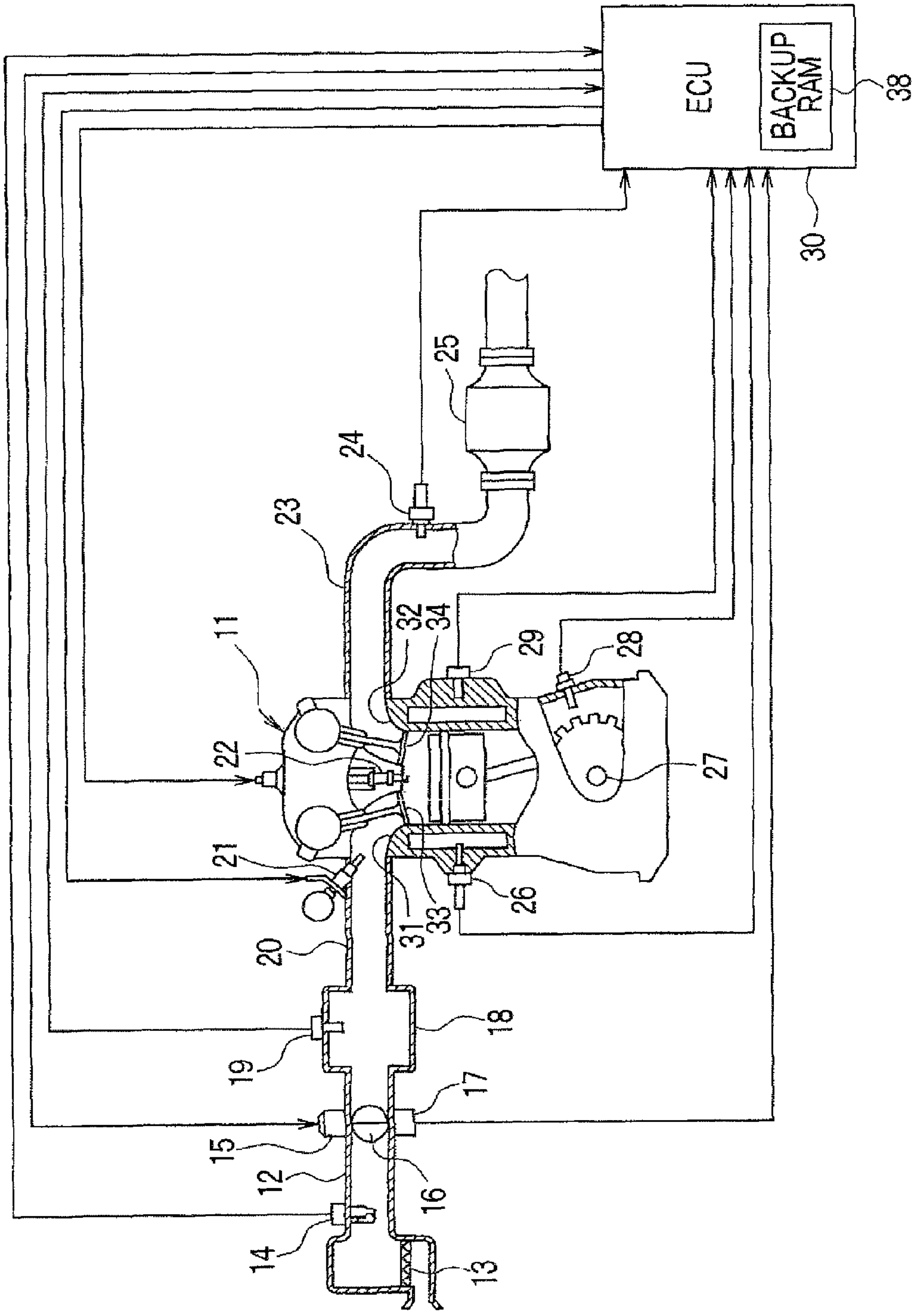
FIG. 1 is a schematic view of an engine control system according to an embodiment of the present invention.

Referring to FIG. 1, an engine control system is explained. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

A surge tank 18 including an intake air pressure sensor 19 is provided downstream of the throttle valve 16. The intake air pressure sensor 19 detects intake air pressure. An intake manifold 20 introducing air into each cylinder of the engine 11 is provided downstream of the surge tank 18, and the fuel injector 21 injecting the fuel is provided at a vicinity of an intake port 31 connected to the intake manifold 20 of each cylinder. A spark plug 22 is mounted on a cylinder head of the engine 11 corresponding to each cylinder to ignite air-fuel mixture in each cylinder.

Figure 2:
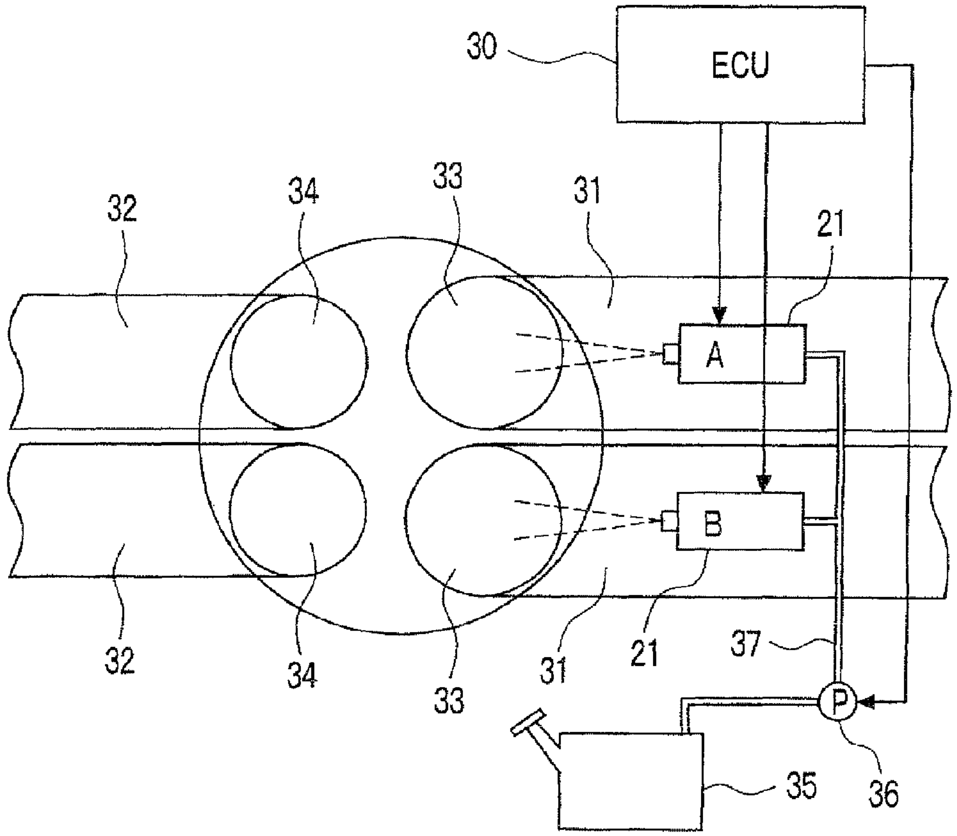
FIG. 2 is a schematic view showing two fuel injectors provided for a single cylinder and vicinity thereof.

As shown in FIG. 2, each cylinder of the engine 11 has two intake ports 31 and two exhaust ports 32. A fuel injector 21 is respectively provided at each intake port 31 or its vicinity. Each intake port 31 is opened/closed by an intake valve 33, and each exhaust port 32 is opened/closed by an exhaust valve 34. Fuel stored in a fuel tank 35 is pumped up by a fuel pump 36, and is supplied to a fuel injector 21 of each cylinder through a fuel supply pipe 37.

As shown in FIG. 1, an exhaust gas sensor (an air fuel ratio sensor, an oxygen sensor) 24 which detects an air-fuel ratio of the exhaust gas is provided in an exhaust pipe 23, and a three-way catalyst 25 which purifies the exhaust gas is provided downstream of the exhaust gas sensor 24.

A coolant temperature sensor 26 detecting a coolant temperature and a knock sensor 29 detecting a knocking of the engine are disposed on a cylinder block of the engine 11. A crank angle sensor 28 is installed on a cylinder block to output crank angle pulses when a crank shaft 27 rotates a predetermined angle. Based on this crank angle pulses, a crank angle and an engine speed are detected.

The outputs from the above sensors are inputted into an electronic control unit 30, which is referred to an ECU hereinafter. The ECU 30 includes a microcomputer which executes an engine control program stored in a Read Only Memory (ROM) to control a fuel injection quantity of a fuel injector 21 and an ignition timing of a spark plug 22 according to an engine running condition. According to the engine running condition and the like, a ratio of command fuel injection quantity between two fuel injectors 21 of each cylinder is varied. This ratio is refereed to as CFIQ-ratio, hereinafter.

When an air-fuel-ratio feedback control execution condition is established during an engine operation, the ECU 30 computes an air-fuel-ratio feedback correction value based on an output of the exhaust gas sensor 24 so that an air-fuel ratio in the exhaust gas agrees with a target air-fuel-ratio (for example, stoichiometric ratio). The air-fuel-ratio feedback control is performed by use of the air-fuel-ratio feedback correction value in order to correct the fuel injection quantity of the fuel injector 21.

Furthermore, the ECU 30 executes each routine for fuel injection correction described in FIGS. 4 and 5, which will be described later. In the fuel injection correction routine, when a specified learning executing condition is established, the CFIQ-ratio between two fuel injectors 21 is compulsorily changed and a fuel injection quantity error (a deviation in an actual fuel injection quantity from a command fuel injection quantity) of each fuel injector 21 is learned respectively. Based on the learning value of fuel injection quantity error, a fuel injection period (fuel injection command value) of each fuel injector 21 is respectively corrected, whereby each fuel injection quantity error of two fuel injectors 21 is respectively corrected with respect to each cylinder.

The way of respectively learning the fuel injection quantity error of two fuel injectors 21 disposed on single cylinder will be described hereinafter. One of two fuel injectors 21 is referred to as a fuel injector "A", and the other fuel injector 21 is referred to as a fuel injector "B", hereinafter.

As shown in FIG. 3, in a case that there is a fuel injection quantity error between the fuel injectors "A" and "B", an actual total fuel injection quantity of the fuel injectors varies according to the CFIQ-ratio of the fuel injectors "A" and "B". The air-fuel ratio varies and the output of the exhaust gas sensor 24 varies, so that the air-fuel ratio feedback correction value also varies. Therefore, there is a correlation between the fuel injection quantity error, the CFIQ-ratio, and the air-fuel ratio feedback correction value with respect to two fuel injectors "A" and "B".

Specifically, in a case that a fuel injection quantity error of the fuel injector "A" is denoted by XA[%] and a fuel injection quantity error of the fuel injector "B" is denoted by XB[%], when the CFIQ-ratio of the two fuel injectors "A" and "B" is established as a first specified ratio "k1:100−k1" (for example, 40:60) and the air-fuel ratio feedback correction value is established as AF1[%], the following equation (1) can be established.

$$k1\times XA+(100-k1)\times XB=100\times AF1 \tag{1}$$

When the CFIQ-ratio of the two fuel injectors is established as a second specified ratio "k2:100−k2" (for example, 60:40) and the air-fuel ratio feedback correction value is established as AF2[%], the following equation (2) can be established.

$$k2\times XA+(100-k2)\times XB=100\times AF2 \tag{2}$$

Based on the above equations (1) and (2), following equations (3) and (4) can be derived.

$$XA=\{(k1-100)\times AF2-(k2-100)\times AF1\}/(k1-k2) \tag{3}$$

$$XB=(k1\times AF2-k2\times AF1)/(k1-k2) \tag{4}$$

The fuel injection quantity error XA[%] of the fuel injector "A" can be computed based on the equation (3), and the fuel injection quantity error XB[%] of the fuel injector "B" can be computed based on the equation (4). These fuel injection quantity errors XA and XB are stored in a nonvolatile memory, such as a backup RAM 38 of the ECU 30.

Figure 4:
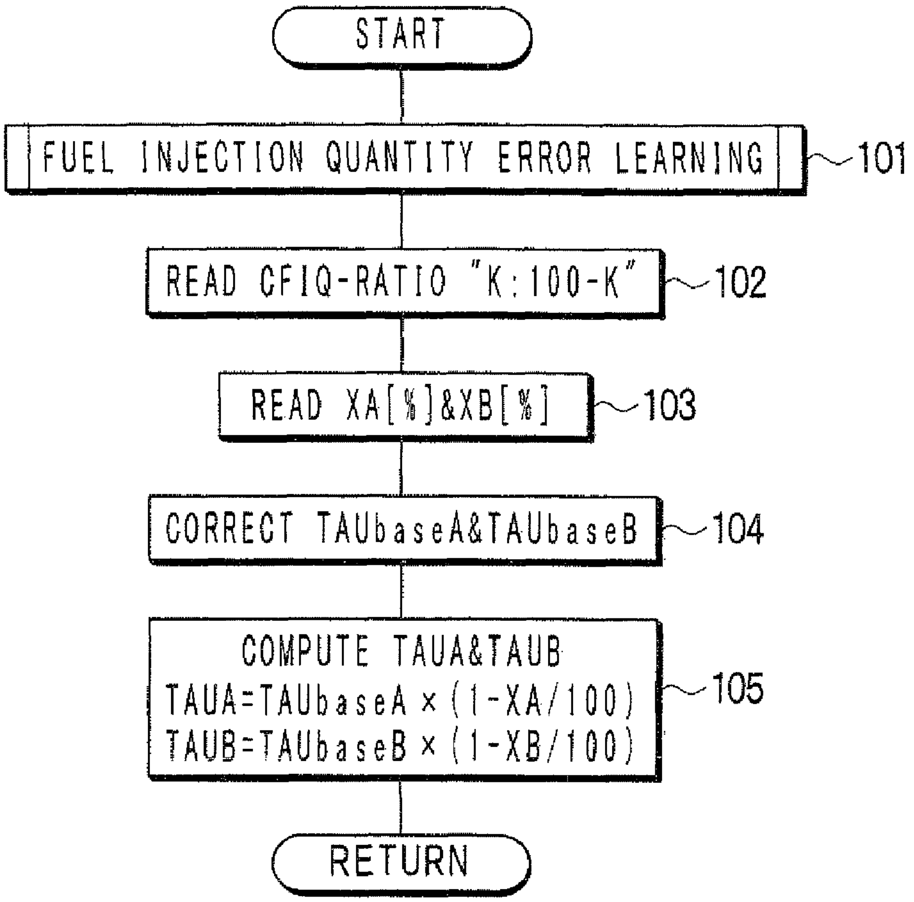
FIG. 4 is a flowchart showing a fuel injection correction main routine.
Figure 5:
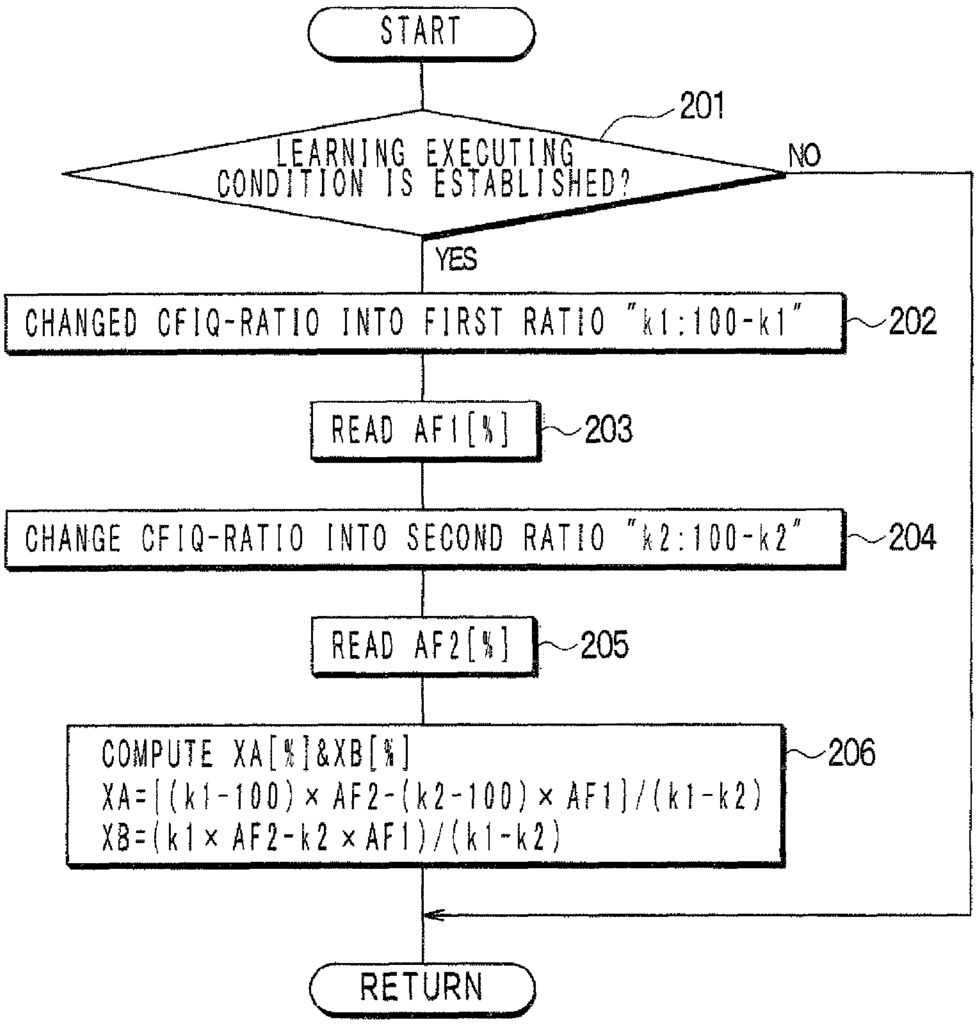
FIG. 5 is a flowchart showing a fuel injection quantity error learning routine.

Referring to FIGS. 4 and 5, the processes of each routine for fuel injection correction will be described hereinafter.

[Fuel Injection Correction Main Routine]

A fuel injection correction main routine shown in FIG. 4 is executed at specified intervals while the ECU 30 is ON. In step 101, a fuel injection quantity error learning routine shown in FIG. 5 is executed so that the fuel injection quantity errors XA, XB are respectively learned.

In step 102, the CFIQ-ratio "k:100−k" of the fuel injectors "A" and "B" corresponding to the present engine running condition is read. Then, the procedure proceeds to step 103 in which the learning value of fuel injection quantity error XA[%] and the learning value of fuel injection quantity error XB[%] are read out from the backup RAM 38.

Then, the procedure proceeds to step 104 in which a base injection period TAUbaseA of the fuel injector "A" and a base injection period TAUbaseB of the fuel injector "B" are corrected in such a manner that a ratio between TAUbaseA and TAUbaseB becomes the CFIQ-ratio "k:100−k".

Then, the procedure proceeds to step 105 in which the base injection period TAUbaseA is corrected by the error XA to obtain an injection period TAUA of the fuel injector "A", and the base injection period TAUbaseB is corrected by the error XB to obtain an injection period TAUB of the fuel injector "B"

$$TAUA=TAU\text{base}A\times(1-XA/100)$$

$$TAUB=TAU\text{base}B\times(1-XB/100)$$

As described above, by correcting the injection period TAUA, TAUB respectively, the fuel injection quantity errors of the fuel injectors "A" and "B" are respectively corrected. In the present embodiment, the process in step 105 corresponds to an error correction means of the present invention.

[Fuel Injection Quantity Error Learning Routine]

A fuel injection quantity error learning routine shown in FIG. 5 is a sub-routine executed in step 101 of the main routine shown in FIG. 4. This fuel injection quantity error learning routine corresponds to an error learning means of the present invention. In step 201, the computer determines whether a specified learning executing condition is established based on whether the engine is at steady operation (for example, at idling state), whether an air-fuel-ratio feedback control is performed, and the like.

When the answer is No in step 201, this routine ends.

When the answer is Yes in step 201, the procedure proceeds to step 202. In step 202, the CFIQ-ratio between the fuel injectors "A" and "B" is compulsorily changed into the first specified ratio "k1:100−k1" (for example, 40:60). Then, the procedure proceeds to step 203 in which the air-fuel-ratio feedback correction value AF1[%] is read after the CFIQ-ratio is changed into the first specified ratio.

Then, the procedure proceeds to step 204 in which the CFIQ-ratio between the fuel injectors "A" and "B" is compulsorily changed into the second specified ratio "k2:100−k2" (for example, 60:40). Then, the procedure proceeds to step 205 in which the air-fuel-ratio feedback correction value AF2[%] is read after the CFIQ-ratio is changed into the second specified ratio.

Then, the procedure proceeds to step 206 in which the fuel injection quantity error XA[%] is computed according to the equation (3) and the fuel injection quantity error XB[%] is computed according to the equation (4).

$$XA=\{(k1-100)\times AF2-(k2-100)\times AF1\}/(k1-k2)$$

$$XB=(k1\times AF2-k2\times AF1)/(k1-k2)$$

These fuel injection quantity errors XA, XB are stored in the backup RAM 38. Each of fuel injection quantity errors XA, XB is learned with respect to each of the fuel injectors "A" and "B" which are provided for a single cylinder.

According to the present embodiment described above, the fuel injection quantity error of each of two fuel injectors "A" and "B" is respectively learned based on the CFIQ-ratio and the air-fuel-ratio feedback correction value. The injection period of each of two fuel injectors "A" and "B" is respectively corrected by use of the learning value of the fuel injection quantity error, whereby the fuel injection quantity error of each of two fuel injectors "A" and "B" is respectively corrected. Thus, even if an error of fuel injection quantity is arisen in the fuel injectors "A" and "B" due to an individual manufacturing tolerance or aging thereof, a ratio of fuel injection quantity between the fuel injector "A" and "B" can be correctly controlled.

Furthermore, according to the present embodiment, when a specified learning executing condition is established, the CFIQ-ratio between the fuel injectors "A" and "B" is compulsorily changed and the fuel injection quantity errors of the fuel injectors are learned based on the CFIQ-ratio and the air-fuel-ratio feedback correction ratio. Every when the learning executing condition is established, the fuel injection quantity error can be learned whereby a learning frequency of fuel injection quantity error can be ensured. Besides, since the fuel injection quantity error can be learned under an engine running condition suitable for learning of the fuel injection quantity error, a learning accuracy of the fuel injection quantity error can be enhanced.

In the above embodiment, when the learning executing condition is established, the CFIQ-ratio is compulsorily changed to learn the fuel injection quantity error. Alternatively, when the CFIQ-ratio is changed according to the engine running condition, the fuel injection quantity error of respective fuel injectors "A" and "B" may be learned.

The fuel injection quantity error may be learned based on a learning value of the air-fuel-ratio feedback correction value or an output of the exhaust gas sensor 24.

In the above embodiment, the fuel injection quantity error is learned. Alternatively, a correction value (a correction coefficient) for correcting the fuel injection quantity error may be learned.

In the above embodiment, the fuel injectors 21 are disposed at the intake port 31 or vicinity thereof. Alternatively, positions of two fuel injectors may be deviated from each other in an airflow direction in the intake passage. Furthermore, the present invention can be applied to an internal combustion engine having three or more fuel injectors for a single cylinder.

What is claimed is:

1. A fuel injection controller for an internal combustion engine provided with a plurality of fuel injectors for an intake side of each of respective cylinders and an exhaust gas sensor in an exhaust passage, the fuel injection controller changing a ratio of command fuel injection quantity between the fuel injectors according to a running condition of the internal combustion engine, the fuel injection controller comprising:

an error learning means for learning a fuel injection quantity error information representing an error of fuel injection quantity of the respective fuel injectors or a correction value for correcting the error of the fuel injection quantity of the respective fuel injectors based on the ratio of command fuel injection quantity between the fuel injectors and an output of the exhaust gas sensor.

2. A fuel injection controller according to claim 1, further comprising:

an error correction means for correcting a fuel injection command value of each of respective fuel injectors based on a learning value of the fuel injection quantity error information.

3. A fuel injection controller according to claim 1, wherein the error learning means compulsorily changes the ratio of command fuel injection quantity between the fuel injectors and learns the fuel injection quantity error information based on the ratio of command fuel injection quantity and the output of the exhaust gas sensor.

* * * * *